Jan. 23, 1962 K. R. McCONNELL 3,018,331

TRANSMISSION LEVEL LIMIT AND CONTRAST CONTROL
FOR FACSIMILE SYSTEMS AND THE LIKE

Filed July 15, 1957

KENNETH R. McCONNELL
INVENTOR.

BY John J. Rogan
ATTORNEY

United States Patent Office 3,018,331

Patented Jan. 23, 1962

3,018,331

TRANSMISSION LEVEL LIMIT AND CONTRAST CONTROL FOR FACSIMILE SYSTEMS AND THE LIKE

Kenneth R. McConnell, New Shrewsbury, N.J., assignor, by mesne assignments, to Litton Systems, Inc., Beverly Hills, Calif., a corporation of Maryland Filed July 15, 1957, Ser. No. 671,766

16 Claims. (Cl. 178—7.1)

This invention relates to the art of transmitting visual representations by electric signals, and more particularly it relates to facsimile transducing systems and the like.

A principal object of the invention is to provide an improved method for automatically maintaining the signal level limits of transmitted facsimile signals irrespective of the range of shade variations in a visual representation or subject copy to be transmitted.

Another object is to eliminate in a facsimile transmission system the necessity of relatively complicated and expert manual adjustments which are ordinarily required to avoid undesirable variation in the transmitted signal level range, so as to achieve a substantially uniform amplitude ratio between maximum and minimum signal levels even for various kinds of representations which may have entirely different background characteristics.

Another object is to provide a novel method and apparatus for automatically controlling the phototube scanner output in accordance with the background or area of maximum "whiteness" in subject matter to be transmitted by electric fascimile signals, so as to maintain proper "contrast" of transmitting signals while insuring a minimum level and preserving a proper signal to noise ratio; also matching the amplitude density characteristics of the facsimile receiver while insuring reliable functioning of the automatic control circuits of the receiver. The invention also enables the optimum utilization of a transmission channel of limited useful decibel range.

A feature of the invention resides in the novel automatic background control for facsimile transmitters and the like using a light excitation source operating on low voltage and relatively high current, for example an incadescent lamp of the filament kind.

Another feature relates to an automatic shade level control for facsimile scanners employing an exciter lamp and phototube combination, wherein the illumination level of the exciter lamp is automatically adjusted to correlate it with the background of a subject copy being scanned, so as automatically to maintain the minimum or white facsimile signal at an optimum value.

A further feature relates to an exciter lamp and phototube combination for scanning purposes, where the lamp and phototube are interlinked by a magnetic control such as a saturable magnetic reactor or magnetic amplifier for automatically adjusting the lamp excitation so as to maintain a standard amplitude ratio between minimum and maximum facsimile levels.

A still further feature relates to the novel organization, arrangement, and relative location and interconnection of elements which cooperate to provide an improved and automatic background control for facsimile transmission systems.

Other features and advantages will appear from the ensuing descriptions, the appended claims, and the attached drawings which show by way of example a preferred embodiment of the invention.

In conventional facsimile transmitters employing an exciter lamp and phototube combination for translating into electric signals the shade densities of the various elemental areas of a subject copy to be transmitted, certain manual adjustments must be made prior to such transmisison to correlate the minimum signal level and the range of the output facsimile signal, with the useful level range of the transmission channel or of the recording apparatus. Such adjustments have heretofore been necessary for two reasons. First, various subject copies have entirely different ranges between "white" and "black" areas, and second, the receivers or recorders as well as the usual transmission channels have a limited useful decibel range. For example, one subject copy may have so-called "white" areas that may be actually gray, and the darker areas may be black or may be of a dark shade of gray. Another subject copy, on the other hand, may have very light background or white areas at one end of the shade range, and the darkest areas may be shades of dark gray or grayish black. For that reason, heretofore, it has been necessary before each transmission for a relatively experienced operator to make rather precise examination of the subject copy and to make time-consuming manual adjustments so as to make sure that the output facsimile signals have a predetermined minimum level and substantially a predetermined contrast range or ratio between minimum and maximum. Such ratio can be correlated with the useful decibel range of the transmission channel, which in many cases is limited to from 14 to 16 db. It is highly desirable, therefore, to provide a facsimile transmitter with means whereby the optimum values and range of the facsimile output signal levels, can be predetermined or preset at the factory or at any other convenient time, with the assurance that such setting will be operative regardless of the background density and shade range of the subject copy to be transmitted.

Figure 1:
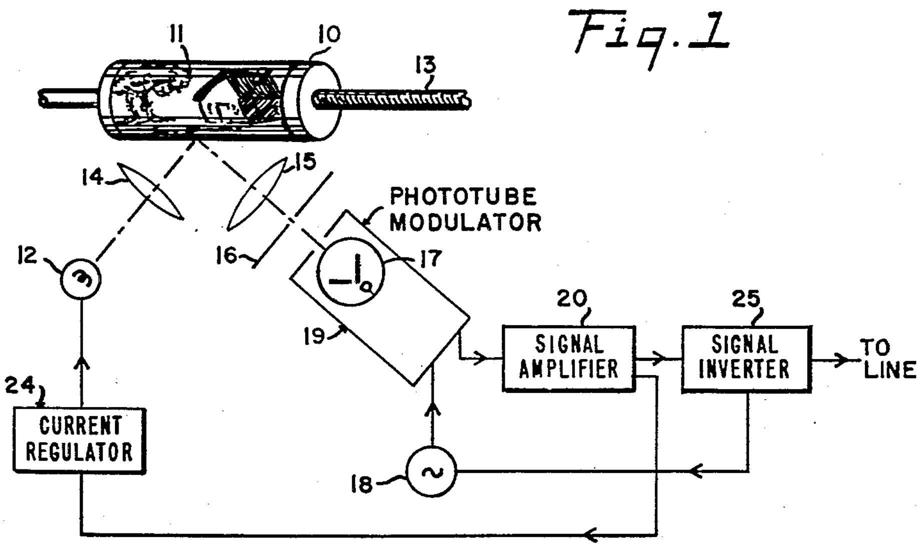
FIG. 1 is a schematic block diagram of a facsimile transmitter embodying features of the invention.

Referring to FIG. 1 of the drawing, there are shown in block diagram form, the more important parts of a facsimile transmitter system embodying the invention. It comprises, for example, a rotating drum or copy holder 10 on which the copy or subject matter 11 is mounted so as to be scanned in successive elemental areas by a conventional scanner including the exciter lamp 12. The invention is not limited to any particular mechanism for producing relative scanning movement between the light source 12 and the copy. Merely for illustration, the drum 10 may be rotated by a lead screw 13 at the same time that it is axially advanced past the scanning head which includes the lamp 12, the condenser lens 14, the objective lens 15, apertured mask 16, and the phototube 17.

As is well known in the facsimile art, the lights and shades of the successively scanned elemental areas are translated into variations in the response of phototube 17. Preferably the phototube response is used to modulate an audio frequency carrier from a suitable audio frequency oscillator 18 in a modulator 19 of which the phototube is an element, so that there is applied to the input of the signal amplifier 20 an audio frequency carrier whose amplitude is modulated in accordance with the lights and shades of the scanned elemental areas. Preferably, although not necessarily, the modulator 19 is of the kind disclosed in U.S. Patent No. 2,430,095 to W. P. Asten and employs a double acting photoelectric cell such as disclosed in U.S. Patent No. 2,459,-293 to J. R. Shonnard. As between various message copies or other subject matters, there may be a great difference in the whiteness of the so-called white background, as well as in the shading of the lighter areas, in the case of half-tones or pictures. A fixed adjustment of the modulator, for all subject copy or pictures, obviously will not give a fixed minimum signal and contrast range necessary to provide satisfactory reproduction of the graduated shade range in the case of pictures or half-tones, or satisfactory black and white recording in the case of printed or similar black and white copy. Furthermore, the limitations of the facsimile receiver as well as the transmission channel, whether a physical or radio channel is used, impose a condition which has to be met for efficient or optimum recording results. That is, the amplitude limits of the facsimile signal must be maintained within a prescribed ratio, since the minimum signal level should be above the noise level of the transmission channel, and the maximum signal level should be near but not above the prescribed maximum signal level of the channel. It is necessary from a practical standpoint, therefore, to limit the difference between maximum and minimum signals to a predetermined range, often between 14 db. and 16 db., depending upon the particular channel or equipment available, and in any particular instance a substantially constant amplitude ratio between maximum or black signal and minimum or white signal is required. Even in the case where the facsimile recorder is in the proximity of the transmitter scanner and no special transmitting line or channel is required, as in duplicating or copying work, the operating characteristics of the reproducer or recorder require a substantially constant contrast or amplitude ratio between minimum and maximum signals be maintained for optimum results.

Figure 2:
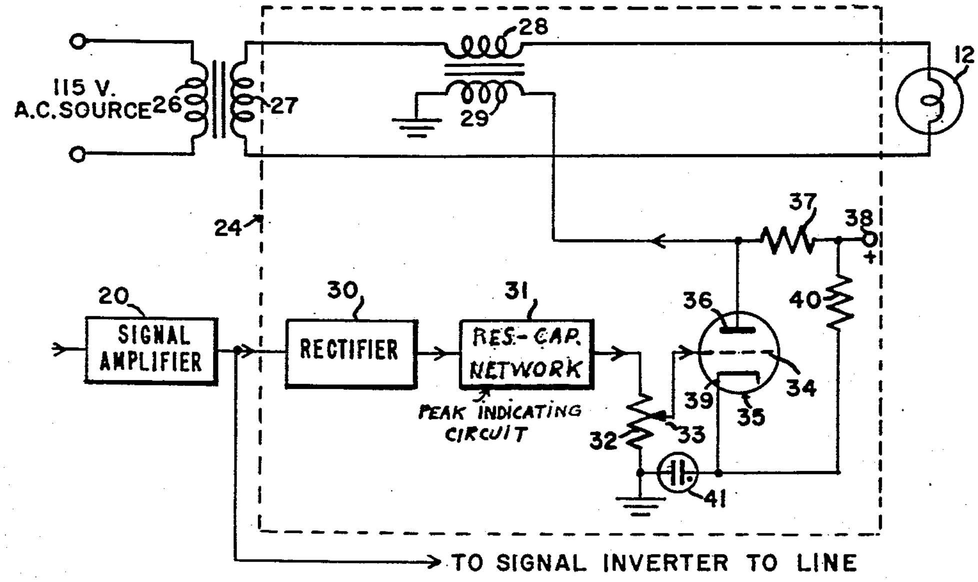
FIG. 2 is a schematic block and circuit diagram showing certain of the parts of FIG. 1 in more detail.

In accordance with the present invention, the necessary settings for the shade control or contrast control can be effected at the time the facsimile transmitter is assembled at the factory, or it can be made at any convenient time or at regularly recurrent periods prior to the transmission of a large number of subject copies. In other words, it is not necesary to perform any manual adjustments before transmitting each subject copy. This result is achieved by automatically adjusting the intensity of the light source. If the source 12 is of the incandescent filament type, it usually requires a low voltage heavy current supply which by ordinary means is rather difficult to control automatically. I have found that such an automatic control of the light source is most efficiently attained by using a special current controller which is indicated schematically in FIGS. 1 and 2 by the block 24. This current controller should employ as the controlling element a magnetic amplifier or saturable magnetic core reactor of any well known kind, employing for example, a pair of magnetically coupled windings 28, 29 on a suitable magnetic core. One of the windings, for example winding 29, is energized by a controlling direct current signal whose magnitude is controlled by the peak white level of the subject copy being scanned. The other winding 28 can be connected to any alternating current supply source, such as commercial supply mains of 115 volts, 60 cycles per second.

In practicing the invention, the modulator 19 is balanced so that for a "black" signal, that is with no light excitation of the cell 17, the desired minimum output current appears at the output of signal amplifier 20. In most systems, however, the maximum output signal corresponds to black, in which event it is necessary to pass the signal through any well known kind of signal inverter 25, such for example as described in my prior Patent No. 2,730,567. The inverter 25 derives its inverse control by being supplied with a portion of the carrier from source 18. The phase displacement between the signal from amplifier 20 and the carrier directly from the source 18, is adjusted so that the desired ratio between the minimum and maximum signal levels is obtained.

A portion of the signal output from amplifier 20 is rectified in a suitable rectifier 30 (see FIG. 2) and the rectified signal is passed through a suitable resistance-capacitance network 31 of the peak indicating type, for the purpose of deriving a direct current control signal proportional to the maximum or white level signal by a peak responsive operation. The direct current signal from network 31 is then passed through the potentiometer resistance 32 whose adjustable arm 33 is connected to the control grid 34 of a suitable variable impedance tube 35. The plate of that tube is connected through a resistor 37 to the positive terminal 38 of a direct current power supply and also to the ungrounded terminal of the winding 29.

It is clear, therefore, that the voltage across resistor 32 is controlled by the so-called white areas of the copy background and will remain substantially constant while one subject copy is being scanned. The voltage appearing between the control grid 34 and the cathode 39 of the amplifier 35 represents the difference between the constant cathode potential drop across voltage regulator tube 41 and the voltage from the contact arm 33 of the potentiometer to ground of the same polarity. If the voltage between 33 and ground increases, the bias of the tube 35 will decrease, increasing the plate current. The plate potential then is lowered and the current through the control winding 29 of the saturable reactor is lowered, increasing the impedance of winding 28 to reduce the current to the exciter lamp 12. This, in turn, reduces the signal from the phototube modulator, maintaining the output from signal amplifier 20 at a substantially constant level on the white of the subject copy. From the foregoing it is clear that the brightness of the exciter lamp 12 decreases automatically as the background area of a subject copy becomes whiter, compared with another subject copy, and vice versa. The control system will function in this manner even though the white or lightest areas of the copy constitute a very small fraction of the copy area.

It will be understood that the invention is not limited to the use of an incandescent filament light source 12. That light source may take the form of a gas-filled crater lamp or tungsten arc lamp of any well known construction which may be operated on direct current or by relatively high frequency alternating current, as compared with the 60-cycle source above mentioned. In such case any suitable current regulator may be employed in lieu of the magnetic regulator 24, such regulator being controlled by the voltage across resistance 32 derived from the white background areas of the subject copy.

It will be understood that the invention is not limited to any particular kind of transmission channel that is used, which may be of the amplitude modulation kind, the frequency modulation or of the frequency shift kind. Thus in the case of frequency modulation or frequency shift by radio, the amplitude ratio of signal from the radio transmitter has to be maintained constant so as to confine the transmission between the proper or authorized frequency excursion limits.

It will also be understood that the invention operates equally well even though the background is of one range over one large area of the subject copy, and of a different range over another large area of the subject copy. Thus the subject copy may have one half with a background shading which is whiter than the background shading in the other half of the copy. Even though the two halves are scanned consecutively, nevertheless the automatic controls described automatically adjust the background signal level for both halves to obtain optimum recording results.

What is claimed is:

1. In an electro-optical system for scanning different subject copies having respective backgrounds of respectively different average shade and which copies have different shade ranges between white and black so as to produce a substantially uniform amplitude ratio between maximum and minimum signals representing, respectively, the opposite ends of the shade range to be scanned and irrespective of the average background of the copy, the combination of a scanning light source, a phototube energized by the light from said source as modulated by the successively scanned areas of the subject copy, a source of carrier current, circuit means connecting said carrier current source to said phototube for modulating said carrier corresponding to said light modulations, electric circuit means for developing a control voltage for said light source and including means to vary said control voltage in accordance with the average light obtained from the background reflectances of the different subject copies, and means to apply said control voltage to said light source for automatically controlling the intensity of light therefrom so as to maintain said modulated carrier within predetermined level limits regardless of the shade range in the particular subject copy being scanned.

2. In an electro-optical system for scanning different subject copies having different whitish light reflecting backgrounds, the combination of a scanning light source, a source of carrier frequency, a phototube for modulating said carrier frequency in accordance with the lights and shades of the successive elemental areas of the subject copy being scanned, electric circuit means connected to said phototube modulator to derive from said modulated carrier a voltage which is substantially constant for any given average shade level of said background, a source of adjustable standard voltage, means to compare said first-mentioned voltage with said adjustable standard voltage to produce a light control voltage, and means to apply said light control voltage to vary the intensity of said light source and thereby automatically to maintain said modulated carrier within desired level limits regardless of the average background light reflectance of the particular subject copy being scanned.

3. In a system for transmitting facsimile signals corresponding to separate subject copies of widely different average whitish light reflecting background, the combination of a facsimile scanner including a scanning light source, a source of carrier, a carrier modulator controlled by the scanning light to modulate said carrier in accordance with successive scanned elemental areas of a subject copy, means to derive from said modulated carrier a direct current control voltage for said light source whose magnitude is dependent upon the average background of the subject copy being scanned, a source of standard direct current voltage, means including a manually adjustable element to combine said control voltage with said standard voltage to produce a resultant potential which is substantially constant for any given whitish shade of said background, a current controller for said light source, and means to apply said resultant potential to said controller to vary the light from said source automatically in inverse relation to the whitish sade of said background.

4. A facsimile system according to claim 3, in which said light source is of the incandescent filament type, and said controller is in the form of a variable magnetic reactance through which the filament current flows.

5. A facsimile system according to claim 4, in which said reactance includes a saturable reactor.

6. A facsimile system according to claim 4, in which said reactance is in the form of a magnetic amplifier.

7. A facsimile system according to claim 4, in which said reactance includes a pair of windings in magnetic inductive relation, one of said windings being connected to have the said filament current flowing therethrough and the other winding being connected to have said resultant potential applied thereto to control the amount of current flowing through the said one of said windings.

8. In a facsimile system for transmitting different subject copies having respectively different average light reflecting backgrounds, means generating facsimile signals of different amplitudes representing copy shadings with a predetermined maximum black signal output and a substantially constant amplitude ratio between the signals corresponding to blackish and whitish scanned areas, the combination of a source of carrier means including a source of light and a phototube for scanning successive elemental areas of the copy to correspondingly modulate said carrier, means including a rectifier network to derive from the modulated carrier a direct current control voltage for said light source, a source of steady direct current voltage, a grid controlled tube, means to bias the control grid of said tube by the resultant of said control voltage and said steady voltage to produce in the tube output a light control current which represents the average light reflected from the said background, and means controlled by the said output current of said grid controlled tube for automatically controlling the intensity of said light source and thereby automatically maintaining said constant amplitude ratio regardless of the average background reflectance of the particular copy being scanned.

9. A facsimile system according to claim 8, in which said light source is an incandescent filament lamp and the means for automatically controlling the intensity of said light source includes a magnetic current controller for varying the magnitude of the filament current, said controller having a controlling winding connected to the output of said grid controlled tube.

10. A facsimile system according to claim 8, in which the said means to bias said control grid includes a source of steady reference direct current voltage connected between the cathode of said grid controlled tube and ground, and an adjustable potentiometer to which said control voltage is connected, said potentiometer having an adjustable contact connected to the said control grid.

11. A scanning illumination system for facsimile transmitters and the like for transmitting subject copies having widely different average backgrounds, comprising, in combination, a source of alternating current, an incandescent filament lamp, a variable reactance connected between said source and lamp and including a variable energizable winding for controlling the magnitude of said reactance and thereby controlling the amount of current through the lamp filament, a source of carrier current, means to modulate said carrier current in accordance with the shade values of successive elemental areas of a subject copy being scanned, means to derive from said carrier a direct current control voltage for said lamp and whose amplitude is proportional to the area of maximum light reflectance in said subject copy, a source of steady direct current reference voltage, means to combine said control voltage and said reference voltage, means to adjust said combining means to produce a resultant voltage, and means to apply said resultant voltage to said winding to vary the lamp intensity automatically in accordance with the background of the subject copy being scanned, and thereby maintaining the level limits of the modulated carrier constant regardless of the average background of different copies to be transmitted.

12. A scanning illumination system according to claim 11, in which said combining means includes a potentiometer resistance to which said control voltage is applied, a grid controlled tube having its control grid connected to an adjustable contact of said potentiometer, means connecting said reference voltage between the cathode of said tube and ground, and means connecting the output of said tube to said winding.

13. Facsimile scanning apparatus for transmitting subject matters having respective backgrounds of different average shade values, comprising a light source and phototube combination to scan the subject matter to produce corresponding signals representing the average shade background of the subject matter, means including a circuit for supplying said light source with voltage, and means for automatically adjusting the current of said circuit to vary the light intensity and automatically maintain a substantially uniform light reflection from the background shades of the subject matter regardless of the average shade of said background.

14. Apparatus according to claim 13 in which the last mentioned means include a peak indicator circuit and a variable impedance device connected in circuit with said light source, and means to preset the impedance of said device to maintain a substantially uniform ratio between maximum and minimum signals which represent the scanned elemental areas on said background.

15. Facsimile scanning apparatus for transmitting items of copy having different reference shade values at one end of the complete shade range, for example the shade of the background as distinguished from the shades of the subject matter on said background, comprising means including a light source and phototube combination for scanning said items to produce a light control signal of a predetermined fixed reference level corresponding to a selected shade such as the background shade in said items of copy and for producing other signals for the shades of the subject matter on said backgrounds, power supply means for supplying said light source with current, means for automatically adjusting said current during said scanning of said selected shade of the copy to produce said fixed reference signals, the last mentioned means including means automatically maintaining said adjustment during the scanning of different shade values of said items.

16. Facsimile scanning apparatus according to claim 15 in which the said means for automatically maintaining said adjustment during the scanning of different shade values of said items includes an amplifier for the said signals and a signal peak indicating network connected to said amplifier for generating a steady control current proportional to the shades of the said backgrounds.

References Cited in the file of this patent

UNITED STATES PATENTS

| | | |
|---|---|---|
| 2,214,072 | Biedermann | Sept. 10, 1940 |
| 2,336,673 | Cooley | Dec. 14, 1943 |
| 2,680,990 | Sweet | June 15, 1954 |
| 2,730,567 | McConnell | Jan. 10, 1956 |
| 2,862,051 | Marzan et al. | Nov. 25, 1958 |